United States Patent [19]

Jensen

[11] Patent Number: 5,070,729

[45] Date of Patent: Dec. 10, 1991

[54] MULTI-COLORED LAYERS FOR VISUALIZING AERODYNAMIC FLOW EFFECTS

[75] Inventor: Ronald N. Jensen, Hampton, Va.

[73] Assignee: The United States of America as represented by the Administrator of the National Aeronautics and Space Administration, Washington, D.C.

[21] Appl. No.: 621,144

[22] Filed: Dec. 3, 1990

[51] Int. Cl.$^5$ ............................................. G01M 9/00
[52] U.S. Cl. .................................... 73/147; 116/201; 116/207
[58] Field of Search .................. 73/147; 116/201, 207

[56] References Cited

U.S. PATENT DOCUMENTS

| | | | |
|---|---|---|---|
| 3,787,874 | 1/1974 | Urban | 116/117 R |
| 3,835,703 | 9/1974 | Bush | 73/147 |
| 3,890,835 | 6/1975 | Dötzer et al. | 73/147 |
| 3,913,393 | 10/1975 | Facy | 73/105 |
| 4,259,431 | 3/1981 | Opitz et al. | 73/147 |
| 4,346,166 | 8/1982 | Montag et al. | 73/147 |
| 4,350,757 | 9/1982 | Montag et al. | 73/147 |
| 4,380,170 | 4/1983 | Dötzer et al. | 73/147 |
| 4,727,751 | 3/1988 | Holmes et al. | 73/147 |
| 4,915,975 | 4/1990 | Watson | 116/201 |

Primary Examiner—Donald O. Woodiel
Attorney, Agent, or Firm—Kevin B. Osborne

[57] ABSTRACT

A method is provided for visualizing aerodynamic flow effects on a test surface. First, discrete quantities of a sublimating chemical such as naphthalene are distinctively colored via appropriate dyes or paints. Next a uniform layer of the sublimating chemical having a particular color is applied to the test surface. This layer is covered with a second uniform layer of a different colored sublimating chemical, and so on until a composite of multi-colored layers is formed having a discrete thickness. Friction caused by an airflow results in the distinctly colored layers being removed in proportion to such aerodynamic flow characteristics as velocity and temperature, resulting in a multi-colored portrait which approximates the airflow on the underlying test surface.

8 Claims, No Drawings

MULTI-COLORED LAYERS FOR VISUALIZING AERODYNAMIC FLOW EFFECTS

ORIGIN OF THE INVENTION

The invention described herein was made by an employee of the U.S. Government and may be manufactured and used by the Government for governmental purposes without the payment of any royalties thereon or therefor.

BACKGROUND OF THE INVENTION

1. Technical Field of the Invention

The present invention relates generally to the visualization of aerodynamic flow effect and more particularly to the use of multi-colored layers to aid in such visualization.

2. Discussion of the Related Art

It is often useful to visualize air flow across a particular surface to study specific aerodynamic effects. For example, viscous media such as oil or heavy gases are placed in test surfaces during wind tunnel tests. The deformations experienced by the applied media approximate air flow patterns. These methods are expensive and are often messy. In addition, they often ignore the effects of isolated small areas of the test surface such as around a rivet head or where fluid separates from the surface. Also, sublimating chemicals of known mass have been applied to test surfaces, subjected to an airflow, and then removed and weighed. The difference between the pre- and post-test masses is indicative of the amount of heat transfer between the air flow and the test surface. However, this method does not permit visualization of the flow.

OBJECTS OF THE INVENTION

It is accordingly an object of the persent invention to provide an improved visualization of aerodynamic flow effects.

It is another object of the present invention to provide such a visualization method which is simple and economicial.

It is a further object of the present invention to visualize aerodynamic flow in discrete quantities.

It is yet another object of the present invention to visualize the aerodynamic flow on small surface areas such as around a rivet head or where fluid separates from the surface.

Additional objects and advantages of the present invention are apparent from the specification which follows.

SUMMARY OF THE INVENTION

The foregoing and additional objects are obtained by a method of visualizing aerodynamic flow efforts according to the present invention. First, discrete quantities of a sublimating chemical such as naphthalene are distinctly colored. Next, a uniform layer of one particular color of sublimating chemical is applied to the test surface. This layer is covered with another uniform layer of a different color of sublimating chemical, and so on until a composite of multi-colored layers is formed on the test surface having a desired thickness. Friction caused by an airflow results in the distinctly colored layers being removed in proportion to such aerodynamic flow characteristics as velocity and temperature, resulting in a multi-colored portrait which approximates an air flow on the underlying test surface.

DETAILED DESCRIPTION OF THE PREFERRED EMBODIMENTS

The present invention utilized multi-colored layers of a substance applied to a particular selected test surface. The substance consists of a particular chemical compound that sublimes from the surface as the airflow in a wind tunnel reaches the particularized temperature and veloicity parameters of the specific test. Discrete quantities of the sublimating chemical are colored or dyed with respective identifying colors via such coloring agents as dyes, paints, ect. This colorization can be accomplished by any known method so long as the color of a resulting colored substance will not mix with the color of another colored substance when applied as discussed below.

Once the discrete quantities of different colored substances are prepared, one colored substance is applied to the test surface to form a first layer of uniform thickness. Next, a second uniform layer of different colored sublimating chemical is applied to cover the first layer. This application step is repeated as often as necessary to form a multi-layered, individually colored composite having a desired thickness. Each respective layer should be of uniform thickness to form a quantitized layer for visualization of the airflow; however, the respective layer may or may not be of equal thickness. A scaling process can be performed which correlates the thickness of a particular layer with the pressure and/or temperature conditions necessary to completely remove this layer from its position in the composite. The individual layers should be as thin as possible to permit a more detailed and exact portrait of the airflow. Also, the total thickness of the composite should be maintained below a certain maximum value to avoid generating any significant flow disturbances, i.e., the composite should approximate a two-dimensional body. Finally, any selected color pattern for the layer may be utilized so long as adjoining layers are differently colored.

Once the desired multi-colored layers are applied, the test surface is placed in a wind tunnel and subjected to airflow. As air flows over the composite, the resulting friction between the air and the uppermost layer causes this layer to be removed. The number of layers removed depends on specific localized air flow characteristics such as velocity and temperature. The applied composite thus results in a multi-colored portrait which substantially corresponds to the aerodynamic flow effects on the underlying test surface. This portrait allows one to visualize the effects of friction, shock waves, and turbulent boundary layer transitions.

This methods can be used to test small surface areas such as around a rivet head or where fluid separates from the surface since the application of the colored sublimated chemical may be quantitatively controlled. Also, the method can be used to visualize test surfaces both on a model in a wind tunnel or on the aecrodynamic surface of an an aircraft.

A particular sublimating chemical for use in the present invention is naphthalene, which is relatively inexpensive and often used in mothballs. Solid naphthalene is heated to form a liquid. Liquids are then mixed with respectively colored dyes such as oil-based paint. The colored naphthalene is then applied to the test surface in discrete layers by dipping, spraying or any other conventional method allowing the chemical to solidify between the application of the respective layers. The formed composite is then subjected to an airflow and the resulting airflow portrait examined.

Many modifications, improvements and substitutions will become apparent to one of skill in the art without departing from the spirit and scope of the present invention as described in the specification and defined in the following claims.

What is claimed is:

1. A method for visualizing aerodynamic flow effects on a test surface, comprising the steps of:
    coloring discrete quantities of a sublimating chemical different colors;
    applying a first uniform colored layer of the sublimating chemical to the test surface;
    applying a second, different colored uniform layer of the sublimating chemical to the first applied layer to form a composite of layers of different colored sublimated chemicals; and
    subjecting the test surface and composite to an airflow, whereby the layers of the composite are removed by the airflow to create a portrait of the aerodynamic flow effects on the underlying test surface.

2. The visualization method according to claim 1, futher comprising applying additional different colored uniform layers of sublimating chemical to said second layer of colored sublimated chemical to form a composite of more than two different colored layers of sublimated material.

3. The visualization method according to claim 2, wherein said coloring step comprises mixing discrete quantities of the sublimating chemical with oil-based paints of different colors.

4. The visualization method according to claim 2, wherein each layer is of the same thickness.

5. The visualization method according to claim 1, wherein the sublimating chemical is naphthalene.

6. The visualized methods according to claim 5, wherein said coloring step comprises mixing discrete quantities of the sublimating chemical with oil-based paints of different colors.

7. The visualization method according to claim 1, wherein said coloring step comprises mixing discrete quantities of the sublimating chemical with oil-based paints of different colors.

8. The visualization method according to claim 1, wherein each layer is of the same thickness.

* * * * *